(No Model.)

F. C. VINEY.
GAS METER.

No. 521,745. Patented June 19, 1894.

WITNESSES
F. D. Goodwin
Frank Bechtold

INVENTOR
Frederick C. Viney.
By his Attorneys
Howson & Howson

UNITED STATES PATENT OFFICE.

FREDERICK C. VINEY, OF PHILADELPHIA, PENNSYLVANIA.

GAS-METER.

SPECIFICATION forming part of Letters Patent No. 521,745, dated June 19, 1894.

Application filed December 18, 1893. Serial No. 493,927. (No model.)

*To all whom it may concern:*

Be it known that I, FREDERICK C. VINEY, a citizen of the United States, residing in Philadelphia, Pennsylvania, have invented certain Improvements in Gas-Meters, of which the following is a specification.

The object of my invention is to increase the measuring capacity of a meter without increasing its size, and with this object in view my invention comprises a certain improvement in the construction and location of the "flag wire" of the meter, all as hereinafter fully set forth.

Figure 2:
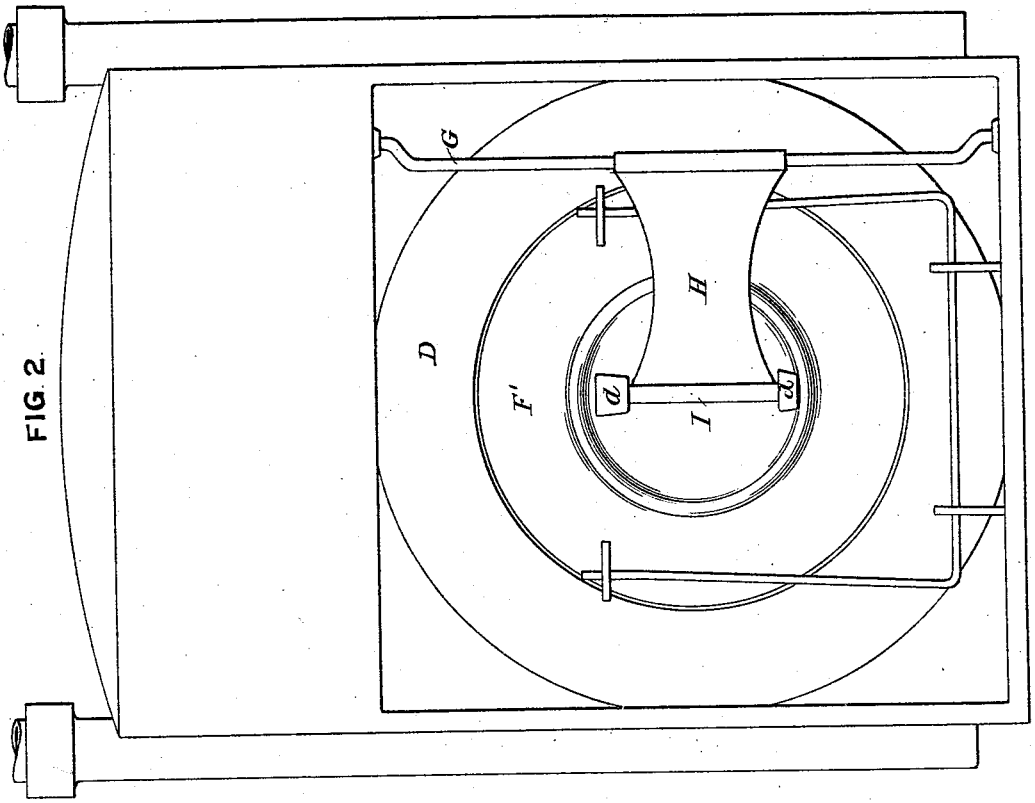
Figure 1:
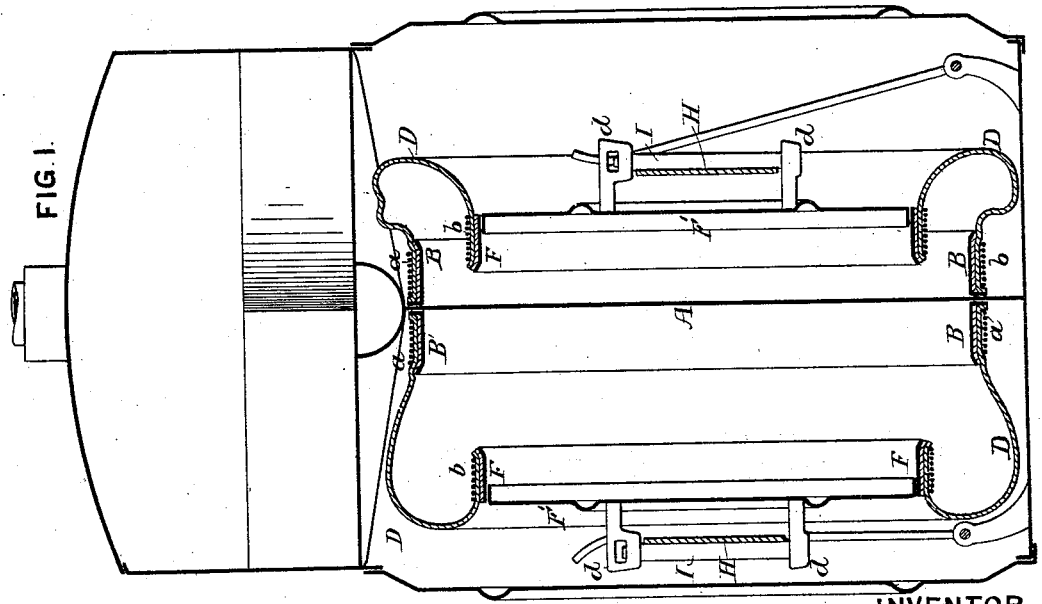

In the accompanying drawings:—Figure 1, is a transverse section of sufficient of a gas meter to illustrate my invention; and Fig. 2, is a side view of the meter with the cover plate of one of the bellows chambers removed.

The casing of the meter, the registering devices, valve mechanism and gas passages may be similar to those of ordinary meters, my invention having no reference to these parts of the meter.

A represents the central partition, separating the two bellows chambers and to each side of this partition is secured the inner ring B of a measuring bellows, the inner edge of the bellows leather D being secured to this ring by an outer wrapping $a$ of cord in the usual manner.

F′ is the outer disk of the bellows carrying the outer ring F, but this ring is less in diameter than the inner ring B of the bellows, and the outer portion of the bellows leather D is turned inward and secured to said outer ring by a wrapping $b$ which is on the inner side of the bellows instead of on the outside as usual. By reason of the fact that the outer ring F is less in diameter than the inner ring B of the bellows, said outer ring can pass within the inner ring when the bellows is compressed, and by reason of the fact that the outer portion of the bellows leather is turned inward before being secured to the ring this entering of the outer into the inner ring of the bellows is effected without undue wrinkling or distorting of the bellows leather, moreover, the inward bend of the outer edge of the bellows leather serves to prevent the leather from buckling inward on the compression of the bellows. The use of the outer ring of less diameter than the inner ring may, however, be resorted to even if the ordinary method of securing the bellows leather by an external wrapping is adopted, and, if desired, the arrangement of large and small rings may be reversed, that is to say, the inner ring may be the smaller and the outer ring may pass over the same on the compression of the bellows. By permitting one ring of the bellows to pass within the other, the maximum degree of compression of the bellows is insured, and in order to permit of the maximum expansion of the bellows I locate the "flag wire" G laterally beyond the limits of the outer disk F′ of the bellows, so that it will not interfere with the outward movement of said disk, and in order to still further remove said "flag wire" from liability of contact with the bellows, I bend the central portion of the "flag wire" into a different plane from the pivotal end portions, as shown in Fig. 2. The "flag wire" is connected by the arm H and pivot stem I to the lugs $d$ on the outer disk F′ of the bellows, and serves to transmit the movement of said disk to the registering mechanism at the top of the meter. As the disk of the bellows moves outward therefore the "flag wire" turns on its axis so as to bring the cranked portion of the same to the front and thus carry it so much farther out of the path of the expanding bellows.

By thus providing for extremes of compression and expansion of the bellows I am enabled, in a given size of meter, to materially increase the capacity of the same, as compared with a meter constructed in the ordinary manner.

Having thus described my invention, I claim and desire to secure by Letters Patent—

The combination in a gas meter, of the measuring bellows, the flag wire having upper and lower bearings located laterally beyond the limits of movement of the outer disk of the bellows, said flag wire being cranked in that portion which is between said bearings, and an arm secured to the cranked portion of the flag wire, said arm extending laterally across the face of the outer disk of the meter, and being connected at its inner end to said disk, substantially as specified.

In testimony whereof I have signed my name to this specification in the presence of two subscribing witnesses.

FREDERICK C. VINEY.

Witnesses:
H. F. REARDON,
FRANK BECHTOLD.